Dec. 17, 1935. V. ZAPATA 2,024,841
POWER MACHINE
Filed Jan. 10, 1935 2 Sheets—Sheet 1
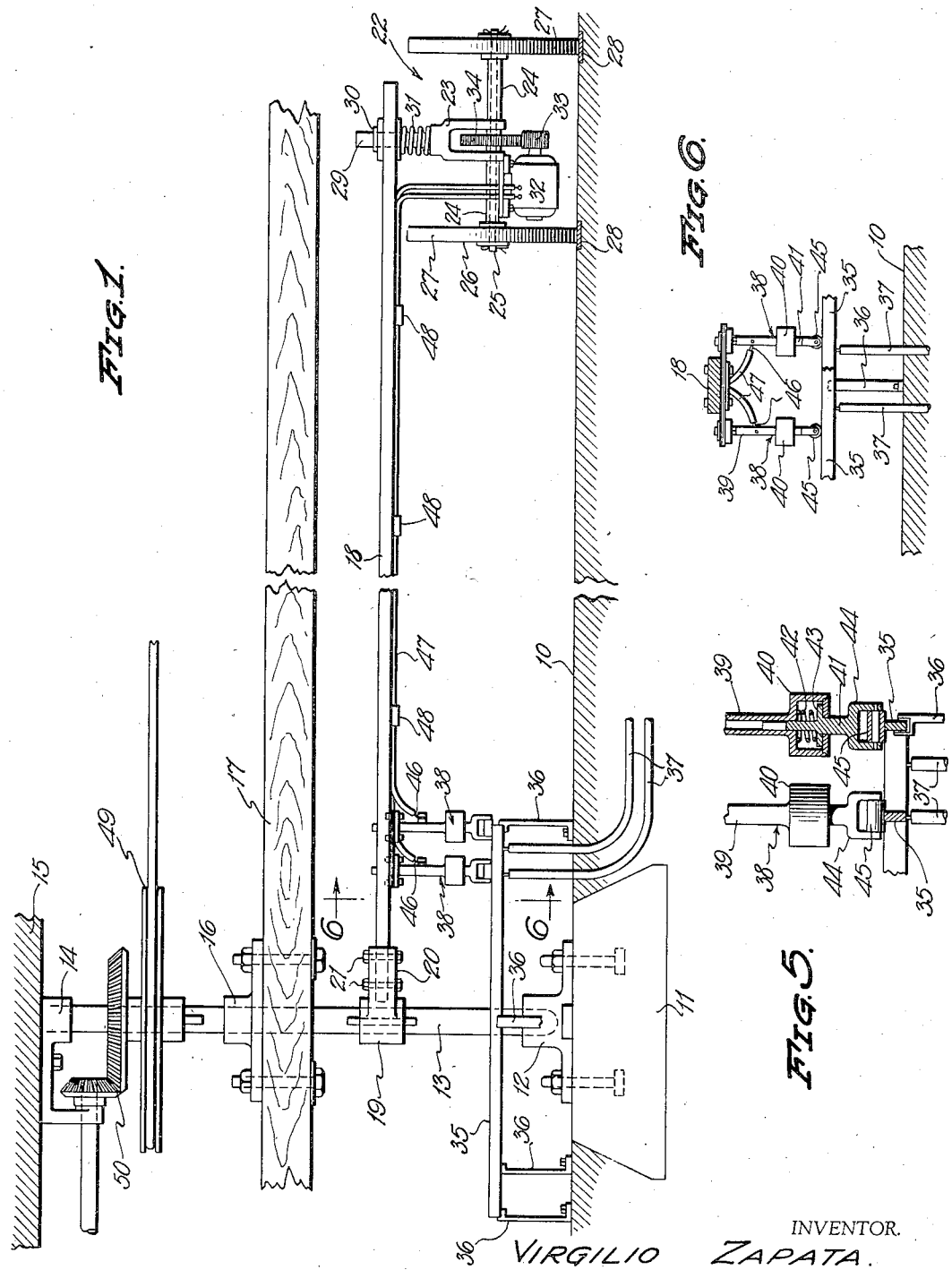
INVENTOR.
VIRGILIO ZAPATA.
BY Ely & Pattison
ATTORNEYS.
WITNESS:
Newton Lusby Dec. 17, 1935.  V. ZAPATA  2,024,841
POWER MACHINE
Filed Jan. 10, 1935  2 Sheets-Sheet 2
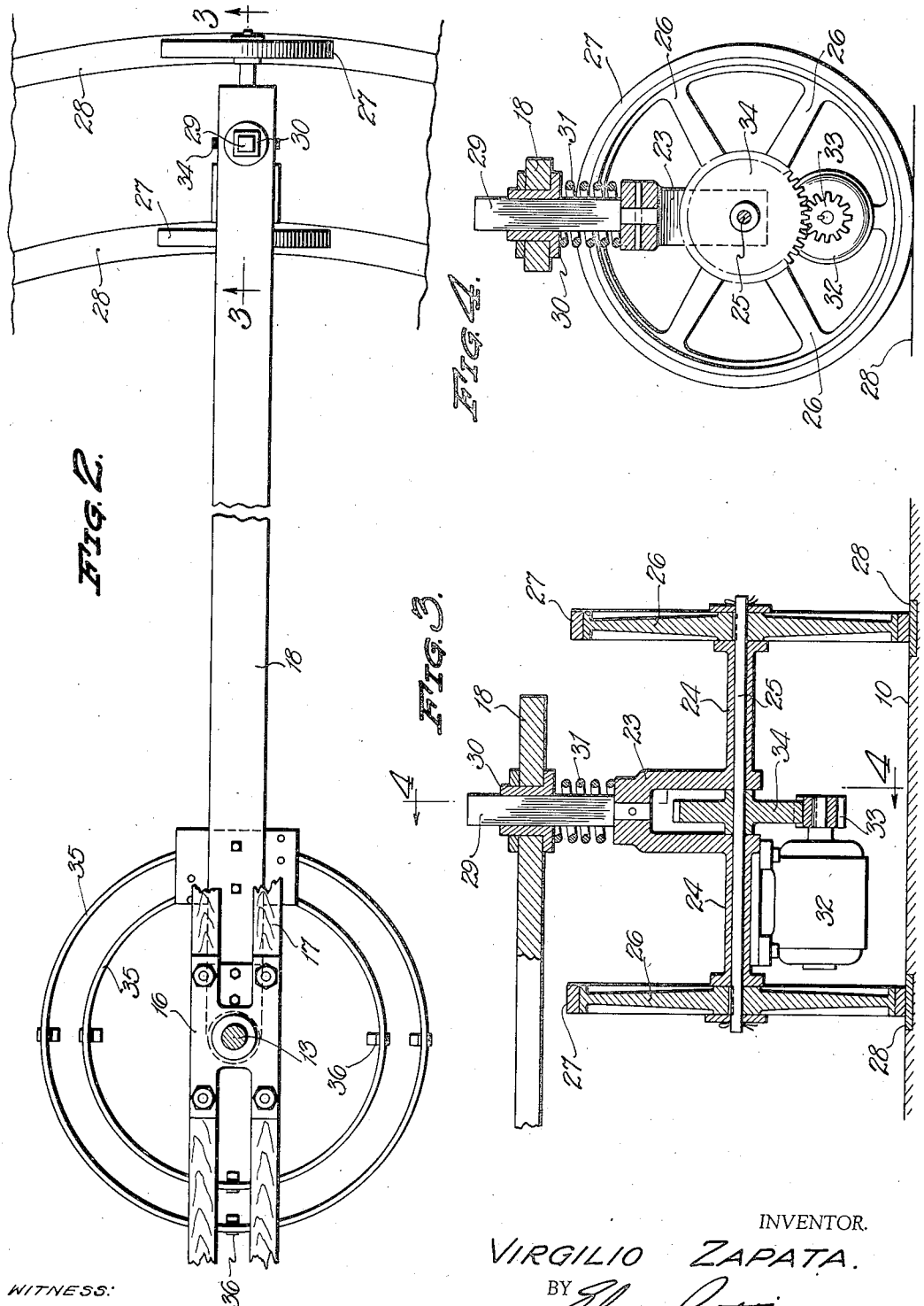
INVENTOR.
VIRGILIO ZAPATA.
BY
ATTORNEYS.
WITNESS:

Patented Dec. 17, 1935

2,024,841

UNITED STATES PATENT OFFICE 2,024,841

POWER MACHINE

Virgilio Zapata, New York, N. Y.

Application January 10, 1935, Serial No. 1,263

4 Claims. (Cl. 74—300)

This invention relates to improvements in power machines and has for one of its main objects, the utilization of the mechanical leverage principle of a wheel and its axle for the increase of torque from the drive part to the driven part.

Another feature of the invention resides in a shaft to be driven to which one end of a lever is fixedly connected, the free end of the lever being connected to a motor driven traction carriage movable about the axis of the driven shaft, whereby the distance between the axis of the driven shaft and the driven traction carriage provides a leverage to increase the torque imparted to the driven shaft and from which power may be taken for any useful purpose desired.

With these and other objects in view, the invention resides in the certain novel construction, combination and arrangement of parts, the essential features of which are hereinafter fully described, and are particularly pointed out in the appended claims and are illustrated in the accompanying drawings, in which:

Fig. 1 is a side elevational view of my improved power machine.

Fig. 2 is a top plan view thereof.

Fig. 3 is a vertical sectional view on the line 3—3 of Figure 2.

Fig. 4 is a vertical transverse sectional view on the line 4—4 of Figure 3.

Fig. 5 is a detail sectional elevational view of the electric collector ring and brushes.

Fig. 6 is a detail vertical sectional view on the line 6—6 of Figure 1.

Referring to the drawings by reference characters, the numeral 10 designates a flat floor or other like supporting surface in which a concrete base or anchorage 11 is set, and mounted on the base 11 is a bearing 12. Journalled in the bearing 12 is the lower end of a vertical shaft 13, the upper end of the shaft being journalled in a bearing 14 supported by a ceiling or other like support 15. The shaft 13 has its intermediate portion journalled in a bearing 16 mounted upon a horizontal beam or frame work 17.

Fixedly connected to the shaft 13 for turning movement therewith is a horizontally disposed lever arm 18, the inner end of the said arm being joined to the shaft by means of a collar 19 which is directly keyed to the shaft and which collar is provided with a socket 20 for the inner end of the lever arm, the same being secured within the socket by bolts 21.

Connected to the free end of the lever arm 18 is a motor driven wheel carriage 22 which includes a frame in the shape of a fork 23, while extending outwardly from the legs of the fork are alined bearings 24 in which an axle 25 is journalled. Fixedly connected to the axle 25 are traction wheels 26, the periphery of the wheels being provided with rubber tires 27. Whereas the wheels may ride over the flat surface 10. I prefer to have them travel over circular rails 28 which are countersunk in the floor surface 10 and are concentric with respect to the axis of the driven shaft 13. Fixed to the fork frame 23 and rising upwardly therefrom, is a square post 29, the same slidably fitting through a square shaped bore provided in a bearing member 30 set into the lever arm 18. Interposed between the top of the fork frame 13 and the bearing member 30 is a spring 31 which tends to normally force the frame downwardly so as to compensate for any wear of the rubber tires of the wheels 26 as it will be appreciated that the lever arm 18 is always maintained at the same horizontal plane, thus the tires of the wheels are always maintained in traction contact with the rails 28.

For the purpose of imparting power to the tractive wheels of the carriage, I provide an electric motor 32 which is suspended from the carriage frame beneath the axle and the armature shaft of the motor is provided with a driving pinion gear 33 which is in constant mesh with a larger gear 34 fixed to the axle 25, and which is disposed within the furcation of the fork frame 23. It will be understood that operation of the motor 32 imparts rotation to the traction wheels 26 through the mesh gears 33 and 34 and axle 25.

For the purpose of transmitting electrical energy to the motor 32 during rotation of the carriage about the axis of the shaft 13, I provide a pair of contact rings 35 which are concentric with respect to the axis of the shaft 13, and supported above the floor 10 by legs 36, the said rings being suitably insulated from their supporting legs to prevent short circuiting. Conductor wires 37 lead to the respective rings 35 from a suitable source of supply and any form of control switch or rheostat may be arranged in the circuit with the wires 37 to control the flow to the contact rings 35.

Carried by the lever arm 18 and depending therefrom for engagement with the respective contact rails 35, are contact brushes 38 each of which includes a tubular casing 39 having an enlarged housing 40 at its lower free end into which a plunger 41 extends, the plunger being normally urged outwardly by a spring 42 enclosed within the housing 40 and interposed between the top wall thereof, and a flange 43 provided on the plunger. The lower end of the plunger 41 terminates in a fork 44 in which a contact roller 45 is mounted, and which roller rides over a contact ring 35.

Connected to the casings 39 are one end of conductor wires 46 which are led through metallic piping or flexible cable 47 to the respective terminals of the motor 32. The metallic piping or flexible cable 47 is suspended by clips or other fastening means 48 to the under side of the lever arm 18.

In operation, assume that the current to the motor 32 is turned on and operation of the motor imparts a driving force to the traction wheels 26 causing the carriage to move with the lever arm 18 about the axis of the driven shaft 13. Due to the leverage exerted to the shaft 13 by the lever 18, the torque is thereby increased and may be taken off from the shaft 13 by any form of power take-off such as for instance, a belt or pulley means 49, or through gear means 50.

While I have shown and described what I consider to be the most practical embodiment of my invention, I wish it to be understood that such changes as come within the scope of the appended claims may be resorted to if desired.

Having thus described the invention, what is claimed as new, is:

1. In a power machine, a vertical rotatable driven shaft, a horizontal arm fixed to said driven shaft, a traction carriage including a frame, an axle journalled in said frame, and wheels fixed to said axle, a square post rising from said frame and freely slidable through a square vertical hole in said arm adjacent its outer free end, spring means interposed between said arm and said frame tending to hold the wheels in traction contact with a traction surface over which they are adapted to ride and for compensating for wear of the treads thereof, a motor carried by said frame, and power transmitting means operatively connecting said motor and said axle for imparting driving power from said motor to said wheels.

2. In a power machine, a vertical rotatable driven shaft, a lever arm fixedly connected to said driven shaft, fixed rails horizontally disposed below the plane of said lever arm and concentric with respect to the axis of said shaft, a motor driven wheel carriage, and resilient coupling means connecting said carriage to the lever arm, the wheels of said wheel carriage having tractive contact with the respective rails.

3. In a power machine, a vertical rotatable driven shaft, a lever arm fixedly connected to said driven shaft, a motor driven wheel carriage including a frame, an axle journalled in said frame, wheels fixed to said axle, and resilient coupling means connecting said frame with said lever arm for permitting vertical movement of said frame and for preventing turning thereof relative to said lever arm.

4. In a power machine, a vertical rotatable driven shaft, a lever arm fixedly connected to said driven shaft, a wheel carriage including a frame, an axle journalled in said frame, wheels fixed to said axle, resilient coupling means between said frame and said lever arm for facilitating vertical movement of said carriage relative to said lever arm, a motor mounted on said frame, and gear means operatively connecting said motor with said axle.

VIRGILIO ZAPATA.